United States Patent [19]

Chao

[11] 3,746,606

[45] July 17, 1973

[54] OFF-LINE PROCESS FOR LAMINATING MAGNETIC TAPE TO TAB STOCK

[75] Inventor: William P. Chao, Dayton, Ohio

[73] Assignee: The National Cash Register Company, Dayton, Ohio

[22] Filed: June 17, 1971

[21] Appl. No.: 154,222

Related U.S. Application Data

[63] Continuation of Ser. No. 857,720, Sept. 15, 1969, abandoned.

[52] U.S. Cl. .................. 161/251, 117/44, 117/240, 156/334, 161/232, 235/61.12 M, 274/41.4, 283/7, 283/58, 346/135

[51] Int. Cl. ... B32b 27/10, B32b 27/28, G11b 5/80

[58] Field of Search ................ 117/44, 160 R, 240; 156/322, 330, 331, 334; 161/165, 184, 214, 227, 232, 251; 235/61.12 M; 260/28.5 AV, 848; 274/41.4; 40/2.2; 101/369, 370; 283/7, 58; 346/135

[56] References Cited

UNITED STATES PATENTS

| | | | |
|---|---|---|---|
| 2,628,539 | 2/1953 | DeNeergaard | 161/122 X |
| 3,586,593 | 6/1971 | Dahl | 161/36 |
| 3,601,913 | 8/1971 | Pollock | 40/2.2 |
| 2,490,550 | 12/1949 | Sermattei | 260/28.5 |
| 2,997,417 | 8/1961 | Dirks | 156/227 |
| 3,245,826 | 4/1966 | Luce et al. | 117/47 |

OTHER PUBLICATIONS

Brackett et al., "Record with Flush Magnetic Stripe," IBM Technical Disclosure Bulletin; Vol. 13, No. 1 (June, 1970). p. 92.

*Primary Examiner*—Alfred L. Leavitt
*Assistant Examiner*—R. A. Dawson
*Attorney*—E. Frank McKinney and Joseph P. Burke

[57] ABSTRACT

The present disclosure is directed to an "off-line" procedure for preparing magnetic ledger cards and similar articles having paper or plastic substrates containing thin stripes of flexible plastic magnetic tape, wherein a solvent-based adhesive comprised in its essential components of an ethylene-vinyl acetate copolymer with significant amounts of a modified phenol-formaldehyde resin and paraffin wax is first applied to a flexible plastic tape previously provided with at least one magnetic layer, film or coating. The adhesive solution is then dried to remove the solvent whereupon the tape can be stored for extended periods of time due to its non-tacky, non-blocking nature at ambient and elevated storage conditions of temperature and humidity. The adhesive is non-blocking at temperatures as high as 130° F. At any desired time thereafter, the thus adhesively coated magnetic tape can be laminated to a paper or suitable ledger or tab stock substrate by the use of heat without requiring any additional, i.e., extraneous, adhesive. The term "off-line" designates that the adhesive is applied before and frequently in a different location from that in which lamination of the paper base and magnetic tape occurs.

4 Claims, 4 Drawing Figures

PATENTED JUL 17 1973

3,746,606

Figure 1:
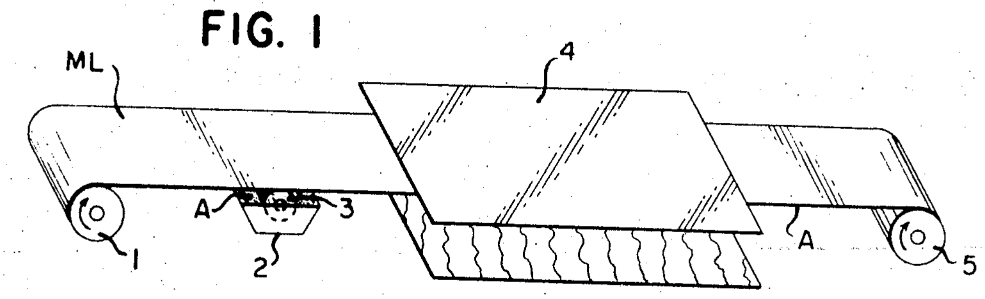

INVENTOR
WILLIAM P. CHAO

BY Joseph P. Burke
E. Frank McKinney
HIS ATTORNEYS

OFF-LINE PROCESS FOR LAMINATING MAGNETIC TAPE TO TAB STOCK

This application is a continuation of U.S. Pat. Ser. No. 857,720, now abandoned.

Prior to the present invention, "off-line" laminating adhesives were known, but most of the "off-line" adhesives in use were either of the pressure-sensitive, solvent-activated or hot melt variety. Each of these has significant drawbacks associated therewith. For example, the pressure-sensitive "off-line" adhesives require a release layer to prevent blocking during storage due to the tacky, pressure-sensitive nature of the adhesive. The hot melt adhesives have inherently high viscosity and consequently are extremely difficult to apply as thin layers by coating procedures. The solvent-activated adhesives can create a messy laminating operation due to the fact that it is difficult to get even activation of the adhesive by the solvent. Also the solvent can take an extended time to evaporate thus resulting in uneven adhesion.

Therefore it is a primary objective of this invention to provide an "off-line" laminating procedure using readily thermally activatable adhesive for producing magnetic ledger cards containing plastic stripes with the magnetic oxide, essentially metallic magnetic films, or other equivalent magnetic layer(s), thereby allowing the adhesive-coated magentic tape to be stored or transported before lamination without blocking. In these respects the adhesive is considered "non-blocking."

Magnetic tape coated with the adhesive utilized in accordance with this invention can be stored under conditions as severe as 130° F. temperature and 90 percent relative humidity without blocking. Hence it can be transported and stored prior to lamination to tab stock wherein it is reactivated by heating to temperature at or above about 240° F., e. g., by use of a roller heated to temperatures of about 240° to about 350° F. and more usually about 250° to about 320° F. and utilizing moderate pressure, e. g., from about 100 to about 250 pounds per square inch.

A typical prior art utilization of pressure-sensitive adhesives in an "off-line" laminating procedure can be found in U.S. Pat. No. 2,628,929 wherein a pressure-sensitive adhesive is utilized to transfer a magnetic coating (to serve as a sound tape on a motion picture film) from a temporary support to the motion picture film. This patent also teaches the use of heat-activatable adhesives for the same purpose as said pressure-sensitive adhesives, but the heat-sensitive adhesives disclosed therein are compositionally dissimilar from those contemplated in accordance with this invention.

The articles of this invention are produced in essentially two stages. The first stage involves the adhesive coating of the magnetic tape to which a magnetic layer was previously applied in accordance with conventional magnetic coating and deposition procedures. Thus, for example, a polyethylene terephthalate sheet having a width of approximately 12 inches and a magnetic iron oxide coating on its upper surface has its under surface coated with a very thin, smooth layer of solvent-based adhesive of the aforementioned composition in accordance with conventional adhesive application procedures, e. g., by use of a partially immersed adhesive transfer roller. The thus adhesively coated magnetic tape is then dried at temperatures ranging from about 210° to about 270° F. for a sufficient period of time, characteristically ranging from about 0.2 to about 1 minute at web speeds of 15 to 25 feet per minute. The adhesively coated magnetic tape can at any time prior to lamination be cut or slit to the desired width in which it is to be employed on the ledger card or tab base stock and provide the magnetic storage capability thereon. Thus, for example, the approximately 12 inch wide "Mylar" tape having the magnetic layer thereon can be slit into 44 rolls, each of which contains a thin tape (stripe) having a width of approximately one-quarter inch. Of course, the tape can be stored in this condition without blocking, viz., self-adhesion. As regards the magnetic tape, the magnetic layer usually extends over substantially the entire width (extent) of the plastic tape, and the tape is usually narrow compared to the ledger card substrate to which it is laminated.

At the desired time and location the adhesively coated magnetic tape can then be subjected to lamination to the ledger card, credit card, ticket, etc., which characteristically can have a width of about 2 to 20 inches, e. g., from about 2 to 16 inches. Paper ledger card stock is then unwound from a roll and brought into contact with the adhesive side of the magnetic tape usually through a pair of rollers, one of which can be heated in order to thermally activate the adhesive composition. The thus laminated assembly of paper (or other equivalent substrate stock) and magnetic tape can then be wound on a storage roll for later finishing (decurling and cutting into desired sheet lengths). Of course, it can be finished very shortly after lamination, that is as soon as the thermally activated adhesive has solidified. The finishing operatin is conducted conveniently by unrolling the stored laminate and passing it to a decurling roller assembly, bar or similar device, followed by sheeting, viz., cutting the continuous laminated web perpendicularly into individual sheets of the desired length. The purpose of the decurling operation is to insure that the ledger cards (substrate) which contain the magnetically stored information are flat in both the longitudinal and cross directions. Decurling can be conducted either before or after lamination. Card curling in either direction causes handling difficulties in the card handler portion of an apparatus and can result in loss of signal (in the event the card does not retain its flat condition) due to the separation of the magnetic information from the magnetic head in a card handler or similar device. The magnetic ledger cards or tab stock can then be packaged in accordance with conventional procedures whereupon it is ready for immediate use.

The magnetic tape employed in accordance with this invention is characteristically a flexible plastic, e. g., ployester, plastic tape, e. g., "Mylar" containing one or more layer(s) of magnetic material, e. g., magnetic oxide or essentially metallic thin magnetic films. It is within the purview of this invention to employ other plastic materials including, but not limited to, such plastic materials as :cellulosic materials, e. g., cellulose acetate, cellulose acetate-butyrates; poly(alkylacrylates) and poly(alkyl methacrylates), including homopolymers and copolymers of the lower alkyl, viz., $C_1$ to $C_4$, acrylates and methacrylates, e. g., poly(methyl acrylate), poly(ethyl acrylate), poly(methyl methacrylate), poly(ethyl methacrylate), etc. The magnetic tape thickness (including both the plastic substrate and the magnetic layer(s) can range from about 0.301 to 2.5 mils. Usually the thickness of the plastic tape (without the magnetic layer) ranges from about 0.3 to 1.7 mils and the thickness of the magnetic layer will vary depending on the magnetic record media, e. g., iron oxide which usually ranges from about 0.2 to about 0.7 mil whereas essentially metallic magnetic layers can be thinner, e. g., as thin as about 0.001 mil. According to a preferred embodiment of this invention, when using a magnetic layer(s) containing iron oxide, the total tape thickness (including both the plastic substrate and the magnetic layer) ranges from about 0.75 to 2.0 mils. A commercially available magnetic tape which can be employed satisfactorily is "777" (marketed by 3M Company) which is nominally 1.5 mil. thick, e. g., 1.42 mils thick, polyethylene terephthalate tape previously provided with a nominally 0.5 mil thick, e. g., 0.4 to 0.6 mil thick, conventional magnetic iron oxide coating, viz., gamma iron oxide pigment in a binder.

Alternatively, located on the upper surface of the plastic tape base can be at least one thin essentially metallic, magnetic film, containing from about 85 to about 99 wt. percent of at least one metal selected from the group consisting of cobalt and nickel, up to about 15 wt. percent (viz., 0 to 15 wt. percent) of at least one metal selected from the group consisting of iron and zinc, up to about 10 wt. percent phosphorus or equivalent reducing agent and up to 0.1 (viz., 0 to trace amounts) of one or more metals selected from the group consisting of sodium and palladium. For example, the magnetic film can be comprised essentially of cobalt, viz., contain from about 90 to about 99 wt. percent of cobalt with from about 1 to about 9 wt. percent phosphorus (or equivalent reducing agent). Other suitable films can contain from about 90 to about 98 wt. percent cobalt, from about 0.05 to about 2 wt. percent zinc and from about 2 to about 6 wt. percent phosphorus (or equivalent reducing agent). Further magnetic films useful in accordance with this invention are those films containing from about 30 to about 70 wt. percent cobalt and correspondingly from about 70 to about 30 wt. percent nickel with trace amounts of phosphours (or equivalent reducing agent). Other suitable film embodiments in accordance with this invention include the nickel-iron films containing from about 90 to about 95 wt. percent nickel, from about 2 to about 7 wt. percent iron and from about 0.5 to about 8 wt. percent phosphorus (or equivalent reducing agent). Other films which can be employed are the nickel-cobalt-iron films, e.g., those containing from about 65 to 90 wt. percent nickel, from about 3 to about 25 wt. percent cobalt, from about 3 to about 6 wt. percent iron and from about 2 to about 5 wt. percent phosphorus (or equivalent reducing agent). Yet another type metallic magnetic film capable of use in accordance with this invention are the cobalt-nicikel films containing from about 94 to about 98 wt. percent of a combination of cobalt and nickel with the remaining 2 to 6 percent being phosphorus (or equivalent reducing agent), said cobalt-nickel films containing from about 85 to about 99 wt. percent cobalt and from about 1 to about 15 wt. percent nickel. These essentially metallic magnetic films can be deposited by vacuum deposition, sputtering, electroless plating, electrolytic plating, etc. The thickness of the thin, essentially metallic, magnetic film can range from about 0.001 mil to about 1.0 mil. Usually the magnetic film thickness ranges from about 0.001 to 0.2 mil. For greater packing density (recording density), the plated film thickness usually ranges from about 0.001 to about 0.020 mil.

The adhesive material employed in accordance with this invention has the following compositional concentration of essential components:

| Component | Concentration (wt. %) |
|---|---|
| ethylene-vinyl acetate copolymer* | 9 to 15 |
| phenol-formaldehyde resin | 8 to 12 |
| paraffin wax | 5 to 13 |
| solvent, e. g., toluene | remainder to make 100 wt. % |

*The ethylene-vinyl acetate copolymer characteristically contains from 65 to 82 wt. percent ethylene and from 18 to 35 wt. percent vinyl acetate and has a softening point (Ring and Ball) ranging between 182° and 228° F. The non-volatile content of the adhesive (as applied) characteristically ranges from 33 wt. percent upward depending upon the desired application viscosity.

While the formulation tabulated hereinabove contains toluene as a solvent, other organic hydrocarbon solvents can be used in place of or in conjunction with toluene. Suitable exemplary aromatic and aliphatic organic hydrocarbon solvents include, but are not limited to, the following: benzene, xylene, $C_5$ to $C_{10}$ liquid hydrocarbons, including the $C_5$ to $C_{10}$ saturated hydrocarbons, e. g., the $C_5$ to $C_{10}$ paraffins and cycloparaffins, e. g., n-pentane, n-hexane, cyclohexane, n-nonane, n-decane, etc. Moreover, non-essential components can be incorporated into the adhesive to tailor-make it for specific purposes, e.g., fillers, pigments, surface active agents, etc., can be included therein.

The utilization of the above tabulated adhesive compositions enables the preparation of magnetic tape having a non-blocking adhesive which resists tacking even at high ambient temperature and storage conditions, e. g., even as high as 130° F. and relative humidity as high as 90 percent. The ability to have a non-blocking adhesive enables the magnetic tape to be coated with adhesive in one plant and then stored or tranported to another plant where it can be laminated to the ledger card or tab stock. Moreover the speed of lamination of the adhesive-coated magnetic tape to the tab stock is not limited by the speed of adhesive application (which has occurred previously) thus allowing faster lamination speeds to be utilized. Moreover the width of the magnetic tape is not limited by that required for the card construction inasmuch as wide web magnetic tape can be coated with adhesive and later slit to the required width(s) prior to lamination. This allows more flexiility in the processing and economy in the purchase of magnetlc tape, for example.

The aforementioned adhesive formulation likewise enables the adhesive to be applied in a very thin layer, e.g., from about 0.05 to about 0.5 mil (dry basis). Characteristically it is desirable to apply the adhesive layer to the backside of the plastic magnetic tape in the form of a very thin, e. g., about 0.08 to about 0.3 mil thick layer (dry basis).

While substrates comprised of paper a preferred and currently utilized class of substrates for such tabulating stock or ledger card base stock, the present invention envisions the use of equivalent plastic materials having substantially the same properties, durability, etc., as the paper ledger card or ticket base stock. Suitable paper and equivalent plastic (e. g., rag, sulfite, tabulating stock, translucent stock and others) include those having a basis weight ranging from about 45 to about 200 pounds per ream. Usually the ledger card substrate comprised of paper base stock ranges in weight from about 70 to about 110 pounds per ream. A ream as defined herein means 3,000 square feet of paper or other substrate surface regardless of the individual sheet size(s). Suitable candidate equivalent materials of a plastic nature, which can serve as ledger card base stock include, but are not limited to, the following: polystyrene; polyesters, such as poly(ethylene terephthalate); polyolefin film and sheet materials, such as polyethylene, polypropylene, ethylene-propylene copolymers; acrylates and methacrylates, e. g., poly(alkyl acrylate) and poly(alkyl methacrylate) homopolymers and copolymers, such as poly(methacrylate), poly(ethylacrylate), poly-(methyl methacrylate), poly(ethylmethacrylate), copolymers of methyl acrylate and ethylacrylate, copolymers of methyl methacrylate and ethyl methacrylate; polyvinyl halides, e. g., poly(vinyl chloride); vinyl esters, e.g., poly(vinyl acetate); copolymers of vinyl halides and vinyl esters, e.g., copolymers of vinyl chloride and vinyl acetate, etc. Usually the ledger card or tab stock substrate thickness ranges from about 2 to 20 mils, a mil being one-thousandths of an inch, viz., 0.001 inch. The substrate thickness characteristically ranges from about 2 to 15 mils. In ledger cards which are subjected to repeated usage over an extended period of time, the substrate thickness characteristically is 5+ mils. In such cases the substrate ledger card thickness can range from about 5 to about 12 mils. In addition to paper and equivalent plastic materials, per se, suitable ledger card, credit card and ticket substrates can be prepared from composites or laminates.

Composites include fibers and/or non-fibrous materials employed in combination with or without a joining adhesive. For example, a composite can be prepared using cellulosic or non-cellulosic, e. g., polyester, polyacrylonitrile, nylon or other synthetic fibers, adhered by heat at selected points of juncture to a plastic sheet. As mentioned above, laminates can also be employed as ledger card substrates. Thus, for example, laminates comprised of paper and any one (or more) of the above mentioned plastic materials can be used. In such cases the lamina (discrete layers from which the laminate is formed) can be joined with or without an extraneous adhesive. Such non-extraneous adhesive lamination can be accomplished by use of heat sealing, viz., use of a plastic material which is capable of thermal activation to an adhesive condition whereby it sticks to the paper lamina without causing thermal damage thereto. Any of the presently available non-woven fabrics (which are themselves composites) can be utilized in preparing any of the composite or laminates which can serve as the ledger card substrate.

According to a preferred embodiment of this invention during the lamination of the adhesively coated magnetic plastic tape to the ledger card or tab base stock, the heat to thermally activate the adhesive is supplied from beneath the surface of the paper, as by a heated roller contacting the paper or in thermally conductive relation therewith. This lower heated roller in conjunction with a water-cooled upper roller provides the necessary heat and pressure to effect lamination of the magnetic tape to the paper base stock. Within a short period of time after the thermal activation of the adhesive has occurred, e. g., within a few seconds, the adhesive is again solidified and the laminate can be rolled for storage.

Figures 2, 3:
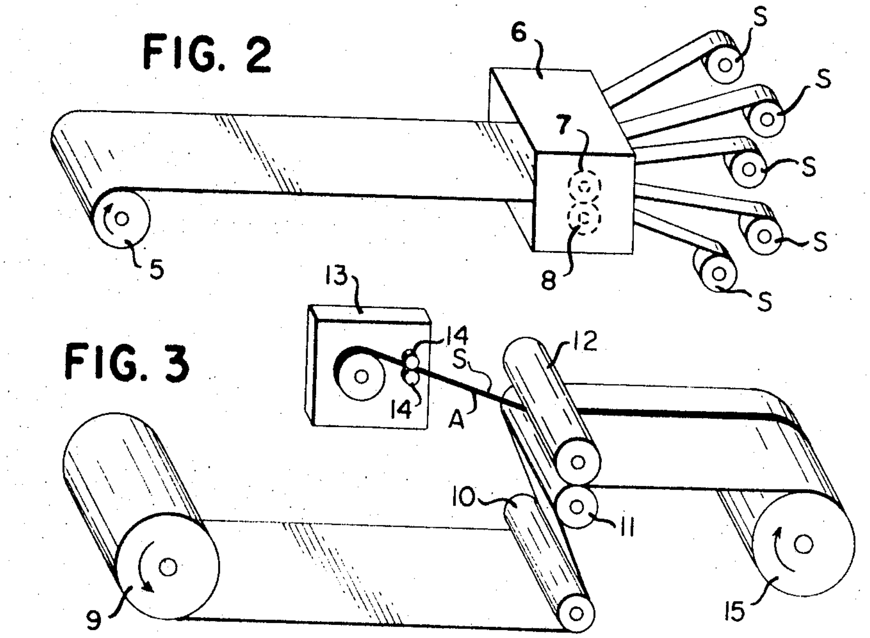
Figure 4:
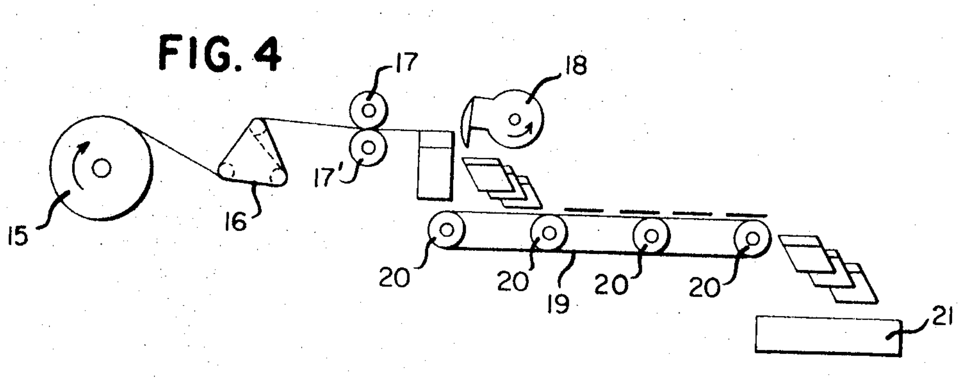

The invention will be illustrated further in conjunction with the FIGS. 1 to 4 which constitute the accompanying drawings. FIG. 1 is a diagrammatic view in perspective showing the application of adhesive followed by drying to yield the non-blocking, adhesively coated magnetic tape. FIG. 2 is likewise a diagrammatic view in perspective showing the slitting of the magnetic tape into smaller width stripes which can be stored in roll form for later use. FIG. 3 is also a diagrammatic view in perspective showing lamination of the previously dried, adhesively coated magnetic tape to the paper ledger card or tab stock followed by the winding of the laminate onto a storage roll. FIG. 4 is a diagrammatic view showing in section an apparatus which can be employed for finishing operations, viz., decurling, sheeting and packaging of the laminated ledger cards having the magnetic tape adhered thereto by the thermally activated adhesive. A detailed description of FIGS. 1 to 4, inclusive, will be given in conjunction with the example which follows:

EXAMPLE

| Adhesive Components | Concentration (wt. %) |
|---|---|
| ethylene-vinyl acetate copolymer | 9 to 15 |
| phenol-formaldehyde modified resin ester (having an acid number of 10 to 20 and a softening point, ring and ball, of 125° to 135° C, viz., 257° to 275° F.) | 8 to 12 |
| paraffin wax (melting between 135° and 145° F.) | 5 to 13 |
| toluene (Solvent) | remainder to make **100** |

At the upper left hand side of FIG. 1 there is shown a roll of magnetic tape 1 having a magnetic layer ML on its upper surface and a width of approximately 12 inches. To the under surface of this tape there is applied the above tabulated adhesive composition via roller 3 immersed in tank 2 and a metering rod (not shown) to deposit a thin layer of adhesive having a thickness of approximately 0.1 mil. The magnetic tape is polyethylene terephthalate tape (base) having a thickness of approximately 1.5 mils and a previously applied 0.5 mil thick gamma iron oxide magnetic coating located on the top surface ML of the tape. The adhesive coated tape is then subjected to a drying operation, e. g., by passing through over 4 (or other equivalent drying apparatus) and is then rolled in the form of a storage roll 5 for further use. This magnetic tape storage roll 5 can be stored for any requisite period of time at elevated temperature and humidity conditions without blocking. As shown in FIG. 2 the magnetic tape roll 5 containing the non-blocking adhesive layer A on the undersurface thereof can be slit into a plurality of smaller width tapes (strips) S which, in turn, can be stored in roll form until the desired time for conducting the lamination. The slitting operation can be conducted by a rotary knife precision slitter assembly as in FIG. 2. Housing 6 contains a plurality of rotary knives mounted on upper roller 7 which cooperate with lower roller 8 providing a bearing surface. The upper roller 7 is equipped with a plurality of rotary knives to accomplish the continuous cutting operations. Thus the dried magnetic tape storage roll 5 can be divided into approximately 44 strips S each having a width of approximately one-fourth inch.

At the time it is desired to conduct the lamination, the paper tabulating card stock substrate having a basis weight of approximately 99 pounds per ream is passed in the form of a supply roll 9 and under a guide roll 10 and assembled at rolls 11, 12 into contact with magnetic tape stripe S. Lower laminating roll 11 is heated to effect heating of the adhesive undersurface A of at least one of the stored magnetic tape strips S unwound from unwinding device 13 through one or more guide rolls 14. The temperature employed to effect the lamination, viz., thermal activation of the adhesive at heated roll 11 is from 250° to 270° F. (roll temperature), but the temperature used can vary depending on the specific substrate and tape base used, care being exercised to avoid thermal damage thereto. In the region directly above heated laminating roll 11 is another roll 12 which in cooperation with roll 11 serves to apply slight pressure at the nip between the rolls thereby exerting requisite pressure which in conjunction with the heat effects lamination of the tape to the paper tab stock. The pressure exerted by these rolls can be, e.g., approximately 190 to 210 p.s.i. The laminated finished roll stock having the magnetic record media on its outer surface is then gathered on a storage roll 15. The time period between the thermal activation of the adhesive, viz., the lamination, and the winding of the laminated ledger card assembly in roll form is approximately 3 to 6 seconds. Thus it can be seen that the thermally activated adhesive dries very quickly. The continuous roll 15 of laminated ledger card-magnetic tape assembly can be immediately cut to the desired sheet size(s) or it can be stored for extended periods of time in its continuous web state.

FIG. 4 shows the finishing operations of decurling via a decurl assembly 16 to place the laminated ledger card magnetic tape stock in flat condition prior to sheeting, viz., cutting to sheets or cards of the desired dimension. The sheeting operation can be done in a continuous manner such as illustrated by rotating sheeter blade assembly 18 which cuts the continuous laminated web into sheets of the desired size and dimension. The continuous web is conveyed via upper and lower driven rolls 17 and 17', respectively, into contact with the sheeter assembly 18. The thus formed sheets can then be carried by a conveyor belt assembly comprised of continuous belt 19 and rollers 20 and thereby deposited into a suitable receptacle 21 for shipment or other disposition.

In accordance with a preferred embodiment of this invention, the ledger card or other tab stock 9 can have a groove(s) made in one or both of the upper and lower surfaces thereof to reduce tape height prior to lamination so as to keep the upper surface of the magnetic tape even in comparison with the paper surface upon which it is laminated. Of course, it is within the purview of this invention to place a plurality of grooves in said ledger card stock wherever a magnetic strip or tape is to be applied. Such grooves can be placed in the paper by the use of grooving rollers (not shown).

As mentioned hereinabove, the magnetic record media layer ML can be an essentially metallic thin magnetic film deposited by an electroless procedure upon a polyester or other flexible magnetic tape substrate. When a magnetic placed film comprised chiefly of cobalt (containing some phosphorus) is desired, it can be prepared in accordance with the following electroless procedure: a "Mylar" film having a thickness of 5 mils is cleaned by dipping it into an aqueous 3-Normal sodium hydroxide solution, rinsing in distilled water, dipping into a 3-Normal hydrochloric acid solution, rinsing in distilled water, and then rinsing in acetone. The cleaned and dried "Mylar" film is then immersed into an adhesive solution containing a 1:3 by weight mixture of an adhesive (synthetic rubber containing fillers such as calcium oxide, silica, etc.) and methyl ethyl ketone and then withdrawn at a rate of about 0.75 to 1.0 centimeters per second. The thus adhesively coated "Mylar" film is then air-dried for 30 minutes and cured for about 10 hours at 80° C. While it is not necessary to employ this adhesive to enhance the bonding of the thin metallic magnetic film ML to the polyester tape base, the use of the adhesive enhances the appearance, smoothness, adhesive and durability of the thin metallic magnetic layer and results in improved performance. Suitable adhesives for this purpose include the "BUNA-N" type of butadiene-acrylonitrile copolymers and such adhesives usually contain from about 6 to about 11 wt. percent adhesives and from about 15 to about 21 wt. percent filler, such as calcium oxide, silica, calcium silicate, Georgia clay, etc., having a particle size less than 5 microns.

The thus dried film is then immersed in a stannous chloride aqueous solution containing about 20 grams per liter of stannous chloride, 10 milliliters per liter of concentrated hydrochloric acid and about 0.0166 grams per liter of sodium lauryl sulphate for an immersion period of about 5 minutes. After removal from the above stannous chloride solution, the thus coated "Mylar" film is immersed in a palladium chloride aqueous solution containing about 0.5 grams per liter of palladium chloride and 5 milliliters per liter of concentrated hydrochloric acid for an immersion period of about 5 minutes. After removal from the palladium chloride solution, the coated film is then immersed in a cobalt-hypophosphite aqueous solution containing about 7.5 grams per liter of cobalt chloride hexahydrate, about 3.52 grams per liter of sodium hypophosphite monohydrate, 12.5 grams per liter of ammonium chloride, 17.9 grams per liter of citric acid, 0.0145 grams per liter of sodium lauryl sulphate, and sufficient sodium hydroxide to adjust the pH to about 8.2, such solutions being maintained at a temperature of approximately 80° C plus or minus 0.5° C. The immersion time employed is dependent on the thickness of the deposit of the cobalt-phosphorus desired.

Of course, magnetic cobalt films can be prepared on plastic bases in accordance with other procedures, e.g., in accordance with the electroless plating procedure of U. S. Pat. No. 3,446,657.

Correspondingly, films of cobalt-zinc, cobalt-nickel, nickel-cobalt, nickel-iron, nickel-cobalt-iron, etc. can be deposited in substantially the same manner by judicious selection of appropriate metal salts for the plating desired. While the deposition of the aforementioned films described above are usually by electroless procedures (since the plastic base is non-conductive), it should be understood that the present invention is by no means limited thereto. Thus electro-plated thin magnetic films can be employed wherein the electroplating is conducted in accordance with known procedures for deposition upon non-conductive substrates, e.g., chemical deposition of a conductive layer followed by electrolytic deposition of the magnetic film.

The magnetic tape containing a non-blocking, readily thermally activatable adhesive on its non-magnetic surface and the laminates containing said tape are envisioned as being articles within the purview of this invention. This adhesive has a composition (on a dry basis, viz., after evaporation of the solvent) as follows:

| Essential Component | (Concentration (wt. %) (Usual) | (Preferred) |
|---|---|---|
| ethylene-vinylacetate copolymer | 45 to 34 | 41 to 38 |
| phenol-formaldehyde resin | 40 to 25 | 36 to 30 |
| paraffin wax | 15 to 41 | 23 to 32 |

What is claimed is:

1. A laminate containing magnetic record media comprising a substrate having a basis weight ranging from about 45 to about 200 pounds per 3,000 ft.$^2$ ream and at least one groove in a surface thereof and positioned within said groove at least one flexible plastic tape having magnetic record media on its outer surface and having its opposite surface adhered to said substrate by an adhesive composition comprising in its esential components from about 34 to about 45 wt. percent ethylene-vinyl acetate copolymer, from about 25 to about 40 wt. percent phenolformaldehyde resin and from about 15 to about 41 wt. percent paraffin wax-;—the total thickness of the plastic tape and the magnetic record media being between 0.75 and 2.0 mils thick and substantially equal to the depth of the groove.

2. A laminate as in claim 1 wherein said substrate is comprised of paper.

3. A laminate as in claim 1 wherein said magnetic record media is comprised of magnetic iron oxide.

4. A laminate as in claim 1 wherein said magnetic record media is comprised of an essentially metallic magnetic film.

* * * * *